United States Patent Office 3,663,654
Patented May 16, 1972

---

3,663,654
**FLAME RETARDANT COMPOSITION OF POLY-
PHENYLENE ETHER, STYRENE RESIN AND
PHOSPHORUS**
William R. Haaf, Voorheesville, N.Y., assignor to
General Electric Company, New York, N.Y.
No Drawing. Filed Feb. 24, 1969, Ser. No. 801,805
Int. Cl. C08g 43/02
U.S. Cl. 260—874                                   15 Claims

ABSTRACT OF THE DISCLOSURE

A blend of a polyphenylene ether and a styrene resin characterized by the addition of a small but effective quantity of elemental phosphorus. The polyphenylene ethers are flame retardant. The admixture of a polyphenylene ether with a styrene resin destroys flame retardant properties. In accordance with the present invention, it has been found that the addition of elemental phosphorus, preferably elemental red phosphorus in small amounts, typically from 0.1 to 5% of the total composition, provides a blend having excellent flame retardant properties. Moreover, other properties of the blend are not materially affected by the addition of the phosphorus.

BACKGROUND OF THE INVENTION

(1) Field of the invention

This invention relates to mixed synthetic resins, and more particularly, to a mixture of a polyphenylene ether and a styrene containing resin characterized by the addition of elemental phosphorus as a flame retardant.

(2) Description of the prior art

Blends of a polyphenylene ether and a styrene resin are known in the art and described in U.S. Pat. No. 3,383,-435 of Eric P. Cizek, incorporated herein by reference. The polyphenylene ether portion of the blend is one having the repeating structural units conforming to the formula:

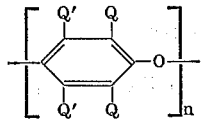

wherein the oxygen ether atom of one unit is connected to the benzene nucleus of the next adjoining unit; $n$ is a positive integer equal to at least 100; and each of Q and Q' is a monovalent substituent selected from the group consisting of hydrogen, halogen, hydrocarbon radicals free of a tertiary-alpha-carbon atom, halohydrocarbon radicals having at least two carbon atoms between the halogen atom and phenyl nucleus and being free of a tertiary-alpha-carbon atom, hydrocarbonoxy radicals being free of a tertiary-alpha-carbon atom, and halohydrocarbonoxy radicals having at least two carbon atoms between the halogen atom and phenyl nucleus and being free of tertiary-alpha-carbon atom. Examples of polyphenylene ethers conforming to the formula and methods for their formation may be found in U.S. Pats. Nos. 3,306,874 and 3,306,875 of Allan S. Hay and U.S. Pats. Nos. 3,257,357 and 3,257,358 of Gelu Stoeff Stamatoff. The styrene resin portion of the blends described in the above noted Cizek patent has at least 25% by weight polymer units derived from the compound having the formula:

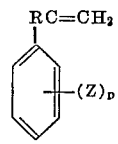

where R is hydrogen, lower alkyl or halogen; Z is a member selected from the class consisting of vinyl, halogen, and lower alkyl; and $p$ is a whole number equal to from 0 to the number of replaceable hydrogen atoms on the benzene nucleus. Typical styrene resins include, by way of example, homopolymers such as polystyrene and polychlorostyrene, the modified polystyrenes such as rubber modified polystyrenes (high impact styrenes), and the styrene containing copolymers such as the styrene-acrylonitrile copolymers (SAN), styrene-butadiene copolymers, styrene-acrylonitrile-alpha-alkyl styrene copolymers, styrene-acrylonitrile-butadiene copolymers (ABS), poly-alpha-methyl styrene, copolymers of ethylvinyl benzene and divinyl benzene, and the like.

It is known in the art that the polyphenylene ethers have excellent flame retardant properties and are classified self-extinguishing and non-dripping according to ASTM test method D 635 and Underwriters' Laboratories Bulletin No. 94. On the other hand, most styrene resins are not self-extinguishing and non-dripping; but rather burn at a slow rate upon ignition. Consequently, due to the poor flame retardant properties of the styrene resins, many blends comprising a styrene resin, even in low concentration, with a polyphenylene ether have poor flame retardant properties and are unable to meet the requirements established by various testing laboratories such as the Underwriters' Laboratories. This restricts the use of the blends for many commercial applications. For example, recent emphasis on safety in autos and trucks by the General Services Administration and other federal and state regulatory agencies indicates that most or all of the plastics used in vehicles will have a requirement for flame retardancy. Further, the construction field looms large as a potential plastics market, and the question of flammability has become a matter of growing concern to the fabricator, and user, and various private and governmental agencies requiring higher safety standards.

It is known in the art that plastics may be rendered flame retardant by the addition of various chemicals to the plastic known as "flame retardants." Flame retardants can be divided into two types: (1) additives which are blended physically with the material and (2) modifiers which are reactive and unite chemically with the plastic. The former include most organic phosphate esters, halogenated hydrocarbons such as chlorinated waxes, antimony oxide, and inorganic salts. The latter group (2) includes chlorendic acid and its derivatives, halogenated phthalic anhydride, phosphorus and halogen-containing polyols, and halogenated phenols. It should be noted, however, that improving flame retardancy is not simply a matter of adding chemicals. Combining flame retardant additives with various polymers not only affects burning characteristics, it frequently changes the color, flexibility, tensile strength, electrical properties, softening point, and moldability characteristics of the plastic. Obtaining adequate flame retardant properties usually requires loading the plastic with a high concentration of flame retardant.

Prior art flame retardants, such as those noted above, have been added to blends of the polyphenylene ethers and styrene resins with some or even substantial improvements in flame retardantant properties. However, in all cases where a flame retardant was added to the blend, a large concentration of the flame retardant was required with resulting deleterious effects upon blend properties.

STATEMENT OF THE INVENTION

The present invetion is predicated upon the discovery that the addition of a small but effective quantity of elemental phosphorus, preferably elemental red phosphorus, to a blend of a polyphenylene ether and a styrene resin substantially improve flame retardant properties without adversely affecting other polymer properties. These results are particularly surprising inasmuch as elemental phosphorus is dangerous material and the white and yellow forms spontaneously ignite upon exposure to air. Furthermore, it is believed that elemental phosphorus has not heretofore been used as a flame retardant. A preferred composition in accordance with the invention comprises from 20 to 80% poly(2,6-dimethyl-1,4-phenylene) ether, 20–80% weight of a high impact polystyrene (styrene modified with rubber) and from 0.5 to 2.0 parts by weight red phosphorus per 100 parts by weight polymer.

DESCRIPTION OF THE PREFERRED EMBODIMENT

The flame retardant polymers of the present invention are the blends of the above noted patent of Eric P. Cizek characterized by the addition of elemental phosphorus. Elemental phosphorus occurs in various forms. The white, yellow, or regular form is the cost common and is typically stored in water away from light. Red or amorphorus phosphorus is formed by heating yellow phosphorus to a temperature of about 240° C. This form is non-poisonous and non-luminous. Other forms include violet, metallic and black. Though all forms improve the flame retardant properties of the polymer blend, red phosphorus is preferred for purposes of the present invention inasmuch as it is relatively safe to handle and readily available.

The manner of adding the phosphorus to the blend is not critical and does not form a part of this invention. Preferably, the phosphorus is added as part of the blend premix, the latter being passed through an extruder with extrusion temperature maintained between 450 and 640° F., dependent upon the composition of the blend. The strand emerging from the extruder may be cooled, chopped into pellets, re-extruded, chopped into pellets and molded to a desired shape.

The concentration of the phosphorus in the blend is not critical and is dependent to a large extent, on the concentration of the styrene resin in the blend and the particular resin used, lower concentration of styrene resin or less flammable styrene resins requiring a lower concentration of phosphorus. In general, a small concentration of phosphorus additive is desirable, 0.1 to 5.0% by weight of the total generally being acceptable and between 0.5 to 2.0% being most preferred.

The following examples will more fully illustrate the invention. In each example, flame retardant properties were measured using the procedures established by the Underwriters' Laboratories in its Bulletin No. 94. Following a modified Underwriters' procedure, a test bar measuring 2½″ x ½″ x ⅛″ thick is twice ignited. After each (10-second) ignition, the test bar must extinguish itself wtihin 30 seconds and the bar may not drip during the burning. For each sample, 10 bars are tested and the average of the 10 self-extinguishing times obtained after either the first or second ignition may not exceed 25 seconds. If any one bar of the 10 burns for a period exceeding 30 seconds after either first or second ignition, the test is considered unsuccessful.

EXAMPLE 1

A blend comprising 50 parts by weight of a poly-(2,6-dimethyl-1,4-phenylene) ether and 50 parts by weight of a high impact polystyrene was mixed with red phosphorus in an amount of 0.94 parts per hundred parts of resin (phr.) in a Waring Blendor. The blended mixture was extruded using a 1″ laboratory extruder to produce about two pounds of pellets. The extruded pellets were molded into test parts by means of a molding machine. The test bars measured 2½″ x ½″ x ⅛″ and were used to determine flammability behavior, heat deflection temperature, and the Izod notched impact strength. Additional 2½″ L-type tensile bars were used to determine tensile properties. The results of the various tests are set forth in the following table:

| Property | Example 1 | Control [1] |
| --- | --- | --- |
| Self-extinguishing time [2] (seconds): | | |
| After 1st ignition | [3] 6 | ([4]) |
| After 2nd ignition | [3] 6 | ([4]) |
| Heat deflection temperature (264 p.s.i., ° F.) | 273 | 266 |
| Impact strength (ft.-lbs./in.-notch) | 0.98 | 1.18 |
| Yield strength (p.s.i.) | 9,050 | 10,200 |
| Ultimate strength (p.s.i.) | 7,300 | 8,700 |
| Elongation (percent) | 22.9 | 22.9 |

[1] Free of phosphorus additive-otherwise the same formulation.
[2] Average of 10 samples, not one bar burning over 30 seconds.
[3] Non-dripping.
[4] Burns completely and drips.

From the above data, it can be seen that the samples containing the phosphorus more than meet the requirements of the Underwriters' Laboratories and in addition, little or no change in properties is realized by the addition of the phosphorus to the blend.

EXAMPLE 2

The procedure of Example 1 was repeated with decrease in the concentration of phosphorus to 0.50 phr. of the total composition with results as set forth below:

| Property | Example 2 | Control |
| --- | --- | --- |
| Self-extinguishing time [1] (seconds): | | |
| After 1st ignition | [2] 10 | ([3]) |
| After 2nd ignition | [2] 17 | ([3]) |
| Heat deflection temperature (264 p.s.i.,° F.) | 274 | 266 |
| Impact strength (ft.-lbs./in.-notch) | 1.18 | 1.18 |
| Yield strength (p.s.i.) | 10,100 | 10,200 |
| Ultimate strength (p.s.i.) | 8,500 | 8,700 |
| Elongation (percent) | 22.9 | 22.9 |

[1] Average of 10 samples, no one sample burning for a period in excess of 30 seconds.
[2] Non-dripping.
[3] Burns completely and drips.

EXAMPLE 3

The procedure of Example 1 was repeated with substitution of a blend comprising 20 parts by weight of a poly(2,6 - dimethyl - 1,4 - phenylene) ether, 80 parts by weight of a high impact, rubber modified polystyrene and 1.5 phr. red phosphorus. The results are as set forth in the following table:

| Property | Example 3 | Control |
| --- | --- | --- |
| Self-extinguishing time [1] (seconds): | | |
| After 1st ignition | [2] 9 | ([3]) |
| After 2nd ignition | [2] 11 | ([3]) |
| Heat deflection temperature (264 p.s.i.,° F.) | 219 | 218 |
| Impact strength (ft.-lbs./in.-notch) | 1.05 | 1.24 |
| Yield strength (p.s.i.) | 7,600 | 7,500 |
| Ultimate strength (p.s.i.) | 7,600 | 7,450 |
| Elongation (percent) | 7.1 | 10.0 |

[1] Avearge of 10 samples, no one sample burning for a period in excess of 30 seconds.
[2] Non-dripping.
[3] Burns completely and drips.

EXAMPLE 4

The procedure of Example 3 was repeated with decrease in the phosphorus content to 1.0 phr. with results as set forth below:

| Property | Example 4 | Control |
|---|---|---|
| Self-extinguishing time (seconds): | | |
| After 1st ignition | [1] 36 | [2] |
| After 2nd ignition | [3] 33 | [2] |
| Heat deflection temperature (264 p.s.i.,° F.) | 214 | 218 |
| Impact strength (ft.-lbs./in.-notch) | 1.39 | 1.24 |
| Yield strength (p.s.i.) | 7,200 | 7,500 |
| Ultimate strength (p.s.i.) | 7,200 | 7,450 |
| Elongation (percent) | 8.6 | 10.0 |

[1] Average of 10 samples (some dripping).
[2] Burns and drips.
[3] Average of 9 samples (some dripping).

This example illustrates that though improvement is realized by the addition of phosphorus, the blend is incapable of passing the Underwriters' Laboratory test because the concentration of phosphorus is too low for the high concentration of styrene resin.

EXAMPLE 5

The procedure of Example 1 was repeated with substitution of a blend comprising 50 parts by weight of a poly - (2,6 - dimethyl - 1,4 - phenylene) ether, 50 parts by weight of an ABS copolymer (Blendex 401 of Marbon Chemical Company) and 3.0 phr. of red phosphorus. The results are set forth in the following table:

| Property | Example 5 | Control |
|---|---|---|
| Self-extinguishing time (seconds): | | |
| After 1st ignition | [1] 8 | [2] |
| After 2nd ignition | [1] 12 | [2] |
| Heat deflection temperature (264 p.s.i.,° F.) | 312 | 303 |
| Impact strength (ft.-lbs./in.-notch) | 0.72 | 0.94 |
| Yield strength (p.s.i.) | 6,820 | 7,200 |
| Ultimate strength (p.s.i.) | 6,420 | 7,500 |
| Elongation (percent) | 34.0 | 54.3 |

[1] Average of 5 samples.
[2] Burns completely and drips.

It should be understood that various changes and modifications may be made in the embodiments described herein without departing from the scope of the invention as defined by the following claims. For example, the phosphorus may be combined with other known flame retardants to decrease the concentration of the overall flame retardant in the blend. In addition, the blends of this invention are typically admixed with other additives such as pigments, plasticizers and the like. Furthermore, third component resins may be added to the blend, such as polyethylene in small concentrations without departing from the scope of the invention.

I claim:

1. In a polymer blend consisting essentially of a polyphenylene ether which is normally self-extinguishing and non-dripping and is of the formula:

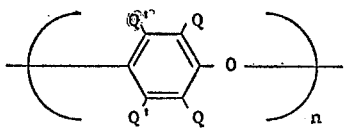

wherein the oxygen ether atom of one unit is connected to the benzene nucleus of the next adjoining unit; $n$ is a positive integer equal to at least 100; and each Q and Q' is a monovalent substituent selected from the group consisting of hydrogen, halogen, hydrocarbon radicals free of a tertiary alpha-carbon atom, halohydrocarbon radicals having at least two carbon atoms between the halogen atom and phenyl nucleus and being free of a tertiary alpha-carbon atom, hydrocarbonoxy radicals being free of a tertiary alpha-carbon atom, and halohydrocarbonoxy radicals having at least two carbon atoms between the halogen atom and phenyl nucleus and being free of a tertiary alpha-carbon atom and a styrene resin which is not normally self-extinguishing and non-dripping, the improvement comprising the addition of elemental phosphorus in an amount whereby a test bar measuring 2½" x ½" x ⅛" formed from the blend will upon ignition not drip and will extinguish itself within 30 seconds.

2. The blend of claim 1 wherein the elemental phosphorus is red phosphorus.

3. The blend of claim 1 where the styrene resin is present in an amount of from 80 to 20% by weight of the total blend and has at least 25% by weight units derived from the compound having the formula:

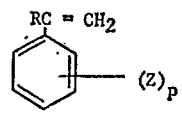

where R is hydrogen, lower alkyl or halogen; Z is a member selected from the class consisting of vinyl, halogen, and lower alkyl; and $p$ is a whole number equal to from 0 to the number of replaceable hydrogen atoms on the benzene nucleus.

4. The blend of claim 3 where each Q is lower alkyl and each Q' is hydrogen.

5. The blend of claim 4 where $p$ is 0 and R is hydrogen.

6. The blend of claim 3 where the phosphorus comprises from 0.1 to 5.0 parts by weight per 100 parts by weight of the polymer.

7. The blend of claim 3 where the phosphorus comprises from 0.5 to 2.0 parts by weight per 100 parts by weight of the polymer.

8. The blend of claim 3 where the polyphenylene ether is a poly(2,6-dialkyl-1,4-phenylene) ether and the styrene resin is a polystyrene homopolymer.

9. The blend of claim 3 where the polyphenylene ether is poly(2,6-dimethyl-1,4-phenylene) ether and the styrene resin is a rubber modified, high impact polystyrene.

10. In a polymer blend consisting essentially of (1) a polyphenylene ether which is normally self-extinguishing and non-dripping and is of the formula

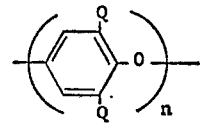

where the oxygen ether atom of one unit is connected to the benzene nucleus of the next adjoining unit, $n$ is a whole integer equal to at least 100 and Q is lower alkyl having from 1 to 4 carbon atoms; and (2) a styrene resin which is not normally self-extinguishing and non-dripping and consists essentially of units derived from compounds having the formula:

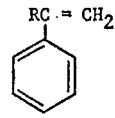

where R is hydrogen, lower alkyl, halogen; the improvement comprising the addition of elemental red phosphorus in an amount whereby a test bar measuring 2½" x ½" x ⅛" formed from the blend will upon ignition, not drip and will extinguish itself within 30 seconds.

11. The blend of claim 10 where the elemental red phosphorus comprises from 0.1 to 5.0 parts by weight per 100 parts by weight of the polymer.

12. The blend of claim 10 where the elemental red phosphorus comprises from 0.5 to 2.0 parts by weight per 100 parts by weight of the polymer.

13. The blend of claim 11 where the polyphenylene ether is poly(2,6-dimethyl-1,4-phenylene) ether in an amount of from 20 to 80% by weight of the total blend and the styrene resin is polystyrene homopolymer in an amount of from 80 to 20% by weight of the total blend.

14. The blend of claim 11 where the polyphenylene ether is poly(2,6-dimethyl-1,4-phenylene) ether in an amount of from 20 to 80% by weight of the total blend and the styrene resin is rubber modified high impact polystyrene in an amount of from 80 to 20% by weight of the total blend.

15. The blend of claim 11 where the polyphenylene ether is poly(2,6-dimethyl-1,4-phenylene)ether in an amount of from 20 to 80% by weight of the total blend and the styrene resin is an acrylonitrile-butadiene-styrene copolymer in an amount of from 80 to 20% by weight of the total blend.

References Cited

UNITED STATES PATENTS

| | | | |
|---|---|---|---|
| 3,373,135 | 3/1968 | Jenkner et al. | 260—45.7 |
| 3,383,435 | 5/1968 | Cizek | 260—874 |
| 3,477,982 | 11/1969 | Dijkstra et al. | 260—45.7 |

SAMUEL H. BLECH, Primary Examiner

U.S. Cl. X.R.

260—45.7 P, 876 R, 887, 893, 897 R, 898, Dig. 24

PO-1050
(5/69)

UNITED STATES PATENT OFFICE
CERTIFICATE OF CORRECTION

Patent No. 3,663,654         Dated May 16, 1972

Inventor(s) William R. Haaf

It is certified that error appears in the above-identified patent and that said Letters Patent are hereby corrected as shown below:

Column 6, line 23, "4" should read -- 3 --.

Signed and sealed this 5th day of December 1972.

(SEAL)
Attest:

EDWARD M. FLETCHER, JR.
Attesting Officer

ROBERT GOTTSCHALK
Commissioner of Patents